United States Patent
Kiyokami et al.

(10) Patent No.: US 10,253,868 B2
(45) Date of Patent: Apr. 9, 2019

(54) LUBRICATING APPARATUS OF VEHICLE

(71) Applicant: TOYOTA JIDOSHA KABUSHIKI KAISHA, Toyota-shi, Aichi-ken (JP)

(72) Inventors: Hiroaki Kiyokami, Toyota (JP); Yukinobu Nishikawa, Anjo (JP); Tetsuo Hori, Toyota (JP); Hakuba Okuno, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/670,243

(22) Filed: Aug. 7, 2017

(65) Prior Publication Data
US 2018/0045295 A1 Feb. 15, 2018

(30) Foreign Application Priority Data

Aug. 12, 2016 (JP) .................. 2016-159009

(51) Int. Cl.
*F16H 57/04* (2010.01)
*B60K 6/20* (2007.10)

(52) U.S. Cl.
CPC ..... *F16H 57/0439* (2013.01); *F16H 57/0441* (2013.01); *F16H 57/0453* (2013.01); *B60K 6/20* (2013.01); *F16H 57/045* (2013.01); *F16H 57/0424* (2013.01); *F16H 57/0427* (2013.01)

(58) Field of Classification Search
CPC ............ F16H 57/0439; F16H 57/0424; F16H 57/0427; F16H 57/045; F16H 57/0441; F16H 57/0453; B60K 6/20
See application file for complete search history.

(56) References Cited

U.S. PATENT DOCUMENTS

| | | | | |
|---|---|---|---|---|
| 2009/0232673 A1* | 9/2009 | Reisch | ............... | F16H 57/0434 417/364 |
| 2013/0319366 A1* | 12/2013 | Karasawa | ............... | F01M 1/02 123/196 R |
| 2014/0158467 A1* | 6/2014 | Kimura | .................. | F01M 11/10 184/6.22 |
| 2015/0167836 A1* | 6/2015 | Long | ....................... | B60K 6/48 60/428 |

FOREIGN PATENT DOCUMENTS

| | | |
|---|---|---|
| JP | 2011-027142 A | 2/2011 |
| JP | 2012-106599 A | 6/2012 |
| JP | 2016-031144 A | 3/2016 |

* cited by examiner

*Primary Examiner* — Jacob M Amick
(74) *Attorney, Agent, or Firm* — Oliff PLC (57) ABSTRACT

A lubricating apparatus for a vehicle, comprises a first oil pump and a second oil pump, and a first supply passage connected to a discharge side of the first oil pump on which the lubricating oil is discharged so as to supply the lubricating oil discharged from the first oil pump to lubricated parts of the power transmission system, a second supply passage that is provided independently from the first supply passage and is connected to a discharge side of the second oil pump on which the lubricating oil is discharged so as to supply the lubricating oil discharged from the second oil pump to the lubricated parts of the power transmission system.

7 Claims, 9 Drawing Sheets

| TRAVEL MODE | ENGINE 20 | MG1 | MG2 | P1 | P2 |
|---|---|---|---|---|---|
| EV TRAVEL | ROTATION STOP | FREE | POWER RUNNING | ROTATING | STOP |
| HV TRAVEL | OPERATING | RE-GENERATIVE | FREE (POWER RUNNING) | ROTATING | ROTATING |

LUBRICATING APPARATUS OF VEHICLE

INCORPORATION BY REFERENCE

The disclosure of Japanese Patent Application No. 2016-159009 filed on Aug. 12, 2016 including the specification, drawings and abstract is incorporated herein by reference in its entirety.

BACKGROUND

1. Technical Field

The technical field relates to a lubricating apparatus of a vehicle, and particularly to a lubricating apparatus capable of properly supplying a lubricating oil even when the vehicle travels at low speed.

2. Description of Related Art

There has been proposed a lubricating apparatus applied to (a) a vehicle including a power transmission system to transmit a drive force from a drive source via an output unit to driven wheels, and the lubricating apparatus includes: (b) a first oil pump mechanically rotary-driven along with rotation of the output unit; and a second oil pump rotary-driven by a rotary drive source different from the output unit, wherein the lubricating apparatus is configured to supply the lubricating oil discharged from these first and second oil pumps to respective components of the power transmission system and lubricate these components. An apparatus described in Japanese Patent Application Publication No. 2012-106599 is one example of the above lubricating apparatus, the second oil pump is rotary-driven by the engine, and the lubricating oil discharged from the second oil pump and the first oil pump is supplied through a common supply passage to lubricated parts such as bearings and others. Note that "lubrication or lubricating" in the present specification includes not only the case for preventing friction and abrasion, but also the case of supplying the lubricating oil to a rotary machine or the like so as to cool this rotary machine, for example.

SUMMARY

In the case of supplying the lubricating oil through a common supply passage as aforementioned, a supply amount of lubricating oil might be restricted by a flow resistance of this common supply passage. That is, a discharge pressure (maximum pressure) of each oil pump varies depending on the rotation speed thereof, and the discharge pressure becomes greater as the rotation speed becomes greater. For example, when the vehicle travels at low speed with a high load having a great requested drive force, the discharge pressure of the first oil pump rotary-driven in accordance with the vehicle velocity becomes small. To the contrary, the discharge pressure of the second oil pump rotary-driven by the engine or the like becomes great. When a large amount of lubricating oil is supplied from the second oil pump, the oil pressure of the supply passage becomes too high, so that the lubricating oil cannot be supplied from the first oil pump. Consequently, only the lubricating oil discharged from the second oil pump can substantially be supplied, so that a supply amount of lubricating oil might be insufficient. At a high load time with a great requested drive force, because a transmission torque is great and a necessary amount of lubricating oil becomes greater, it might be impossible to secure a sufficient amount of lubricating oil only by using the second oil pump.

An object of the present disclosure is to properly supply a lubricating oil from multiple oil pumps including a first oil pump even when the vehicle travels at low speed.

A first aspect of the present disclosure is a lubricating apparatus applied to (a) a vehicle having a power transmission system that transmits a drive force from a drive source via an output unit to driven wheels, and the lubricating apparatus includes: (b) a first oil pump configured to be mechanically rotary-driven along with rotation of the output unit so as to discharge a lubricating oil; a second oil pump configured to be rotary-driven by a rotary drive source different from the output unit so as to discharge the lubricating oil; (c) a first supply passage connected to a discharge side of the first oil pump on which the lubricating oil is discharged so as to supply the lubricating oil discharged by the first oil pump to lubricated parts of the power transmission system; and (d) a second supply passage that is provided independently from the first supply passage and is connected to a discharge side of the second oil pump on which the lubricating oil is discharged so as to supply the lubricating oil discharged from the second oil pump to the lubricated parts of the power transmission system.

In a second aspect of the present disclosure, in the lubricating apparatus of the vehicle according to the first aspect, (a) the vehicle may be a hybrid vehicle including an engine and a rotary machine for travel as the drive source, and the vehicle includes an EV (electric vehicle) travel mode in which the vehicle travels by the rotary machine for travel in a state in which the engine is stopped, and an HV (hybrid vehicle) travel mode in which the engine operates on a higher load side than that in the EV travel mode. (b) The second oil pump may be an oil pump mechanically rotary-driven along with rotation of the engine.

According to the first aspect, since the first supply passage connected to the first oil pump and the second supply passage connected to the second oil pump are independently provided so as to supply the lubricating oil to the common lubricated parts, even during the low speed traveling in which the rotational speed of the first oil pump rotary-driven in accordance with the vehicle velocity is slow, it is possible to supply the lubricating oil to the common lubricated parts separately from both the first and second oil pumps via the respective different supply passages. Accordingly, even during the low speed traveling with a high load in which a requested drive force is great, it is possible to supply a sufficient amount of lubricating oil to the predetermined lubricated parts from both the first oil pump and the second oil pump, and properly lubricate these lubricated parts.

The second aspect relates to a hybrid vehicle including the EV travel mode and the HV travel mode, and is the case in which the second oil pump is an oil pump mechanically rotary-driven along with the rotation of the engine; and during the traveling in the EV travel mode with a low load, the lubricating oil is supplied by the first oil pump; and on the other hand, during the traveling in the HV travel mode with a high load, the lubricating oil is supplied from both the first oil pump and the second oil pump via the different supply passages. In this case, even in the HV travel mode at a low vehicle velocity with a high load in which a requested drive force is great, it is possible to properly supply the lubricating oil from both the first oil pump and the second oil pump via the respective different supply passages. Specifically, at the high load time, since the rotation speed of the engine is generally brought to be relatively high, a large amount of lubricating oil is supplied from the second oil pump at a high discharge pressure, and at the same time, the lubricating oil is also supplied from the first oil pump at a relatively low discharge pressure; therefore, it is possible to properly lubricate the common lubricated parts with the lubricating oil supplied from the both oil pumps. In addition, as the second oil pump, an oil pump that is mechanically rotary-driven along with the rotation of the engine is used; thus, compared with the case of employing an electric oil pump rotary-driven by an electric motor for pump, no controlling is required, and it is advantageous in cost, or the like.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

The present disclosure is preferably applied to an engine drive vehicle, a hybrid vehicle including a rotary machine for travel in addition to an engine as a drive source for travel, and others; but the present disclosure can also be applied to an electric vehicle or the like equipped with only an electric motor as a drive source. As the rotary machine for travel, it is proper to use a motor generator that can alternatively use functions of an electric motor and an electric power generator, for example, but an electric motor may also be used. As the power transmission system, a horizontal type transaxle such as an FF (front engine-front drive) transaxle having multiple shafts arranged in the vehicle width direction may preferably be used, but an FR type or a four-wheel drive type power transmission system may also be used.

An output unit of the power transmission system driving the first oil pump is a differential unit or the like that distributes a drive force transmitted from the drive source via a gear mechanism and others to right and left driven wheels, for example.

A first supply passage and a second supply passage are configured to supply the lubricating oil to respective components (gears, bearings, and rotary machines, etc.) of the power transmission system and lubricate these components. The common lubricated parts may be parts involved in power transmission, such as gears and bearings, may be rotary machines, or may be both of them. The first supply passage and the second supply passage may be configured to only supply the lubricating oil to the common lubricated parts, but may be individually defined so as to lubricate their own responsible components of the power transmission system other than the common lubricated parts. Depending on the necessary oil mount that varies among the parts to which the lubricating oil is supplied, it is possible to respectively set the intake performances (intake mount per rotation) and others of the individual oil pumps, thus suppressing unnecessary lubrication. A heat exchanger such as an oil cooler may be provided to each supply passage, or an oil storage storing the lubricating oil may be provided to each supply passage, thereby individually setting the lubrication performances and others.

The present disclosure is preferably applied to a hybrid vehicle including an EV travel mode and an HV travel mode, but may also be applied to a hybrid vehicle that travels only in the HV travel mode in which the engine is brought to primarily operate and the rotary machine for travel to secondarily operate, for example.

The first oil pump and the second oil pump may be provided on the intake sides thereof with a common intake port where respective intake oil passages of the both oil pumps are connected to each other; but these oil pumps may also be independently provided with different intake ports via different intake oil passages. In the latter case, an arrangement of the intake ports and meshes may be separately set depending on the discharge mount and the supply passages of the respective oil pumps. In addition, it is possible to separately provide the intake ports to different oil reservoirs where a flow of the lubricating oil is restricted by a partitioning wall or the like, so that it is possible to separately set an intake performance of each oil pump or the like depending on the amount of return oil to each oil reservoir or the like. A flow restricting part such as the partitioning wall may be configured such that oil levels of the multiple oil reservoirs are different from each other in a static state in which fluctuations of oil levels become stopped; and it may also be configured that the lubricating oil having returned to the oil reservoir flows over the partitioning wall, or the lubricating oil flows via an orifice provided to the partitioning wall, thereby substantially evening the oil levels of the multiple oil reservoirs.

Hereinafter, embodiment examples of the present disclosure will be described in detail with reference to drawings. Note that in the following embodiment examples, the drawings are appropriately simplified or deformed for convenience of explanation, and the dimension ratios, shapes, etc., of respective components therein are not always correctly depicted.

Figure 1:
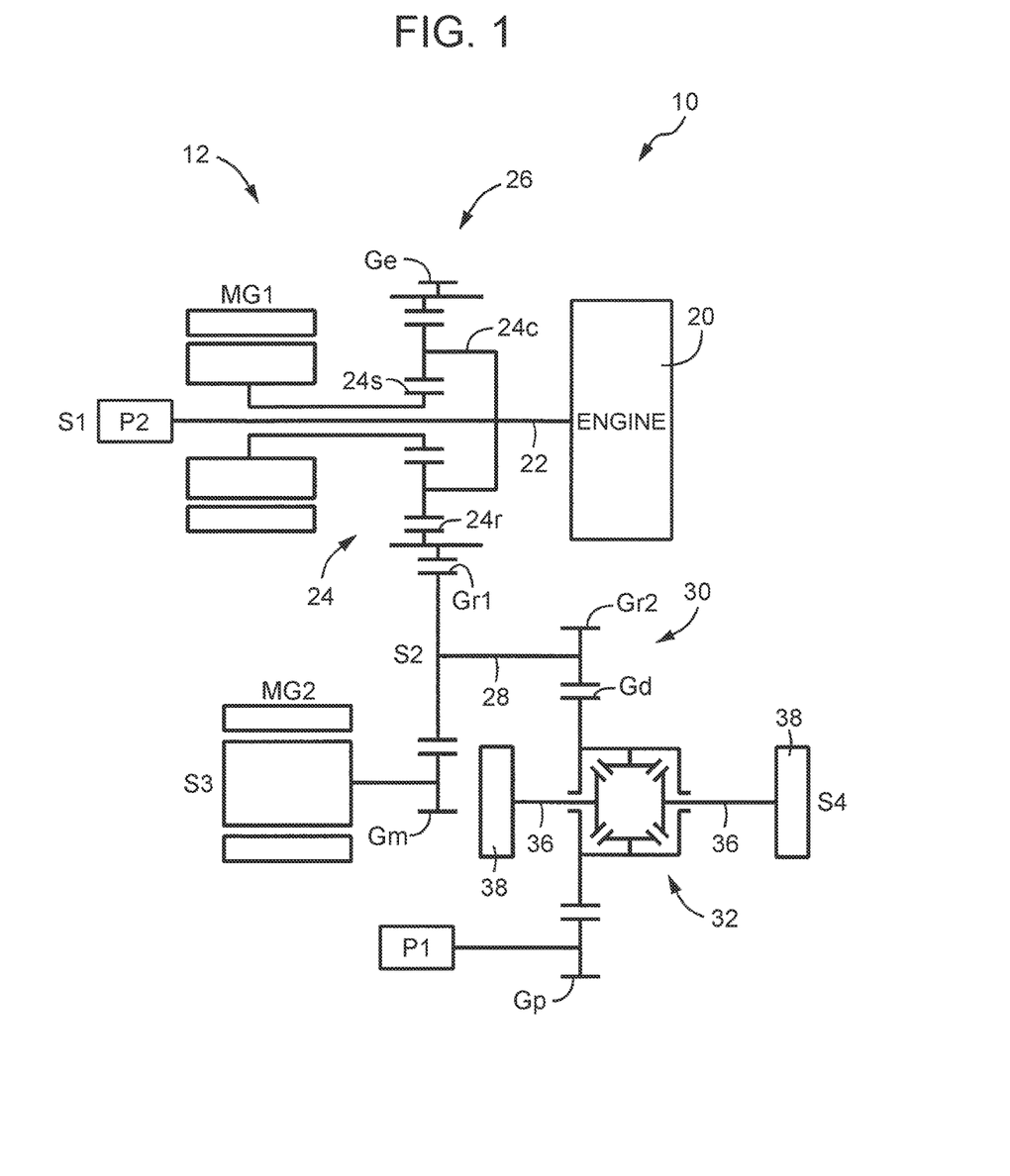
FIG. 1 is an outline view showing a power transmission system of a hybrid vehicle, in an explored state, to which the present disclosure is applied.
Figure 2:
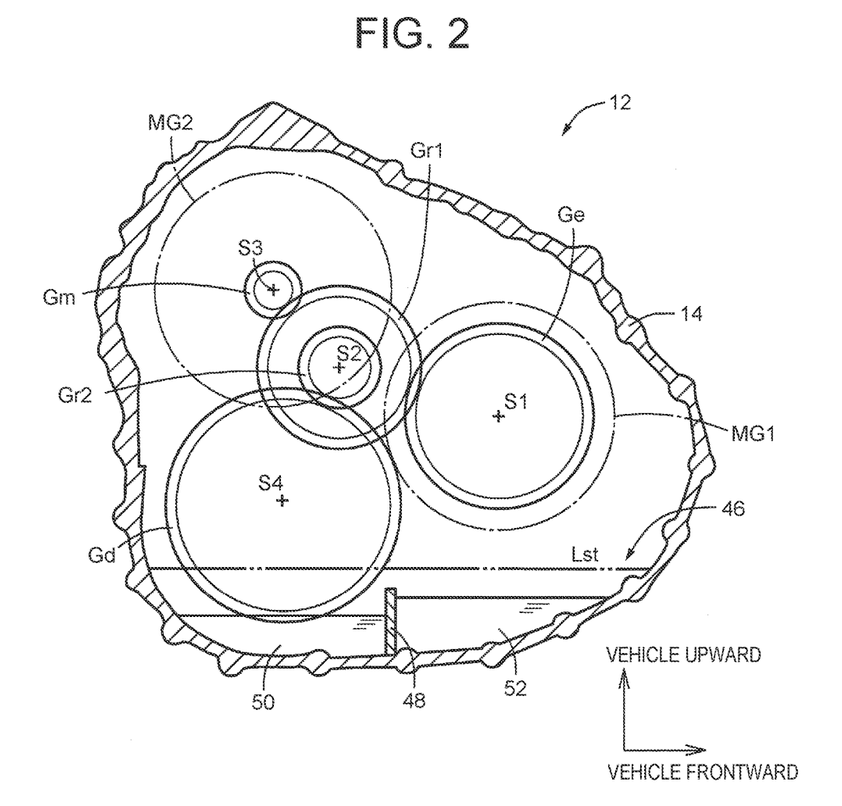
FIG. 2 is a sectional view explaining a positional relation between multiple shafts of the power transmission system of the hybrid vehicle of FIG. 1.

FIG. 1 is an outline view explaining the power transmission system 12 of the hybrid vehicle 10 to which the present disclosure is preferably applied, and is an exploded view showing, in an exploded manner, that multiple shafts composing the power transmission system 12 are located within a common plane, and FIG. 2 is a sectional view showing a positional relation of these multiple shafts. The power transmission system 12 is a horizontal type transaxle for a hybrid vehicle such as an FF vehicle having multiple shafts arranged along the vehicle width direction, and is housed in a transaxle case 14 shown in FIG. 2.

The power transmission system 12 includes a first axial line S1 to a fourth axial line S4 that are substantially parallel to the vehicle width direction, and an input shaft 22 connected to the engine 20 that is a drive source is arranged on the first axial line S1, and a single-pinion type planetary gear unit 24 and a first motor generator MG1 are concentrically arranged to the first axial line S1. The planetary gear unit 24 and the first motor generator MG1 function as an electric differential unit 26, and the input shaft 22 is connected to a carrier 24c of the planetary gear unit 24 that is a differential mechanism, the first motor generator MG1 is connected to a sun gear 24s, and an engine output gear Ge is provided to a ring gear 24r. The carrier 24c corresponds to a first rotary element, the sun gear 24s corresponds to a second rotary element, the ring gear 24r corresponds to a third rotary element, and the first motor generator MG1 corresponds to a rotary machine for differential control. The first motor generator MG1 is alternatively used as an electric motor or an electric power generator, and by continuously controlling the rotational speed of the sun gear 24s through regenerative control in which the first motor generator MG1 functions as the electric power generator, the rotational speed of the engine 20 is continuously changed, and is then outputted from the engine output gear Ge. That is, this electric differential unit 26 also functions as an electric continuously variable transmission unit. The torque of the first motor generator MG1 is set to be zero so as to bring the sun gear 24s to idle, thereby preventing the engine 20 from co-rotating. The engine 20 is an internal combustion engine that generates a motive power by combustion of fuel.

There is provided on the second axial line S2 a reduction gear unit 30 including a large reduction gear Gr1 and a small reduction gear Gr2 that are provided at both ends of a shaft 28, and the large reduction gear Gr1 meshes with the engine output gear Ge. The large reduction gear Gr1 also meshes with a motor output gear Gm of a second motor generator MG2 disposed on the third axial line S3. The second motor generator MG2 is alternatively used as the electric motor or the electric power generator, and is used as a drive source for travel of the hybrid vehicle 10 by being subjected to power running control so as to function as an electric motor. This second motor generator MG2 may be regarded as a rotary machine for driving the hybrid vehicle 10.

The small reduction gear Gr2 meshes with a differential ring gear Gd of a differential unit 32 arranged on the fourth axial line S4, each of the drive force from the engine 20 and the drive force from the second motor generator MG2 is transmitted via the differential unit 32 and is split into the right and left drive shafts 36, and is then transmitted to the right and left driven wheels 38. This differential unit 32 corresponds to an output unit, and the differential ring gear Gd corresponds to an input gear. A gear mechanism is composed of the engine output gear Ge, the large reduction gear Gr1, the small reduction gear Gr2, the differential ring gear Gd, and others. As apparent from FIG. 2, among the first axial line S1 to the fourth axial line S4, the fourth axial line S4 is set at a lowermost position in the vehicle vertical direction, and the second axial line S2 and the third axial line S3 are set at more upward positions than the fourth axial line S4, and the first axial line S1 is set at a more obliquely upward position in the vehicle frontward direction than the fourth axial line S4.

Figure 3:
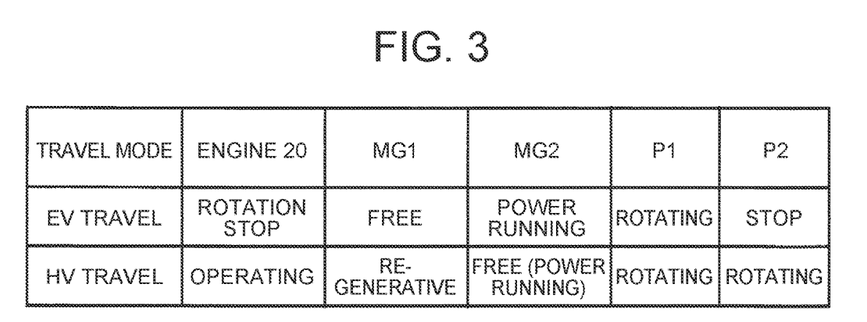
FIG. 3 is a view explaining two types of travel modes executable in the hybrid vehicle of FIG. 1.
Figure 4:
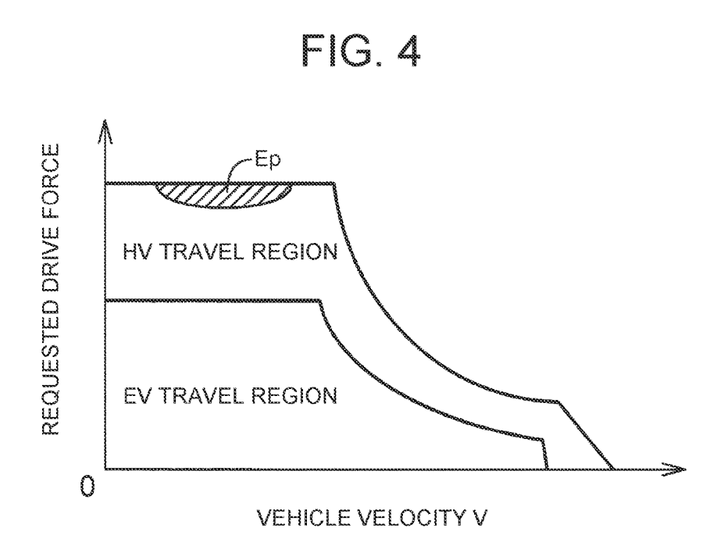
FIG. 4 is a map explaining one example of travel regions of the two types of travel modes of FIG. 3.

In such a hybrid vehicle 10, the EV travel mode and the HV travel mode shown in FIG. 3 are executable, and switching is carried out between the EV travel mode and the HV travel mode in accordance with a mode switching map in which a requested drive force (e.g. accelerator operation amount) and a vehicle velocity V are defined as parameters, as shown in FIG. 4, for example. In the EV travel mode, in a state in which the rotation of the engine 20 is stopped, the vehicle travels by subjecting the second motor generator MG2 to the power running control so as to use the second motor generator MG2 as the drive source, and the EV travel mode is selected in a region of a low requested drive force, that is, of a low load. The rotation of the engine 20 is substantially stopped even during the vehicle traveling, by stopping fuel supply or the like to the engine 20, and setting the torque of the first motor generator MG1 to be zero so as to bring the sun gear 24s of the planetary gear unit 24 to freely rotate. In the HV travel mode, the vehicle travels using the engine 20 as the drive source by regenerative-controlling the first motor generator MG1, and this mode is selected in a region of a higher requested drive force (high load) than that in the EV travel mode. In this HV travel mode, the second motor generator MG2 is used as the drive source by being secondarily subjected to the power running control at an acceleration of the vehicle or the like, or is used as the drive source by being subjected to the power running control all the time.

Instead of the HV travel mode, or in addition to the HV travel mode, there may be provided an engine travel mode using only the engine 20 as the drive source all the time. The power transmission system 12 of the hybrid vehicle 10 is merely an example, and various manners may be employed as follows: for example, the double-pinion type planetary gear unit may be used as the planetary gear unit 24, or the power transmission system 12 may be composed by using multiple planetary gear units; or alternatively, the second motor generator MG2 may be concentrically disposed to the first axial line S1; or a mechanical transmission unit may be employed instead of the electric differential unit 26, or the like.

Figure 5:
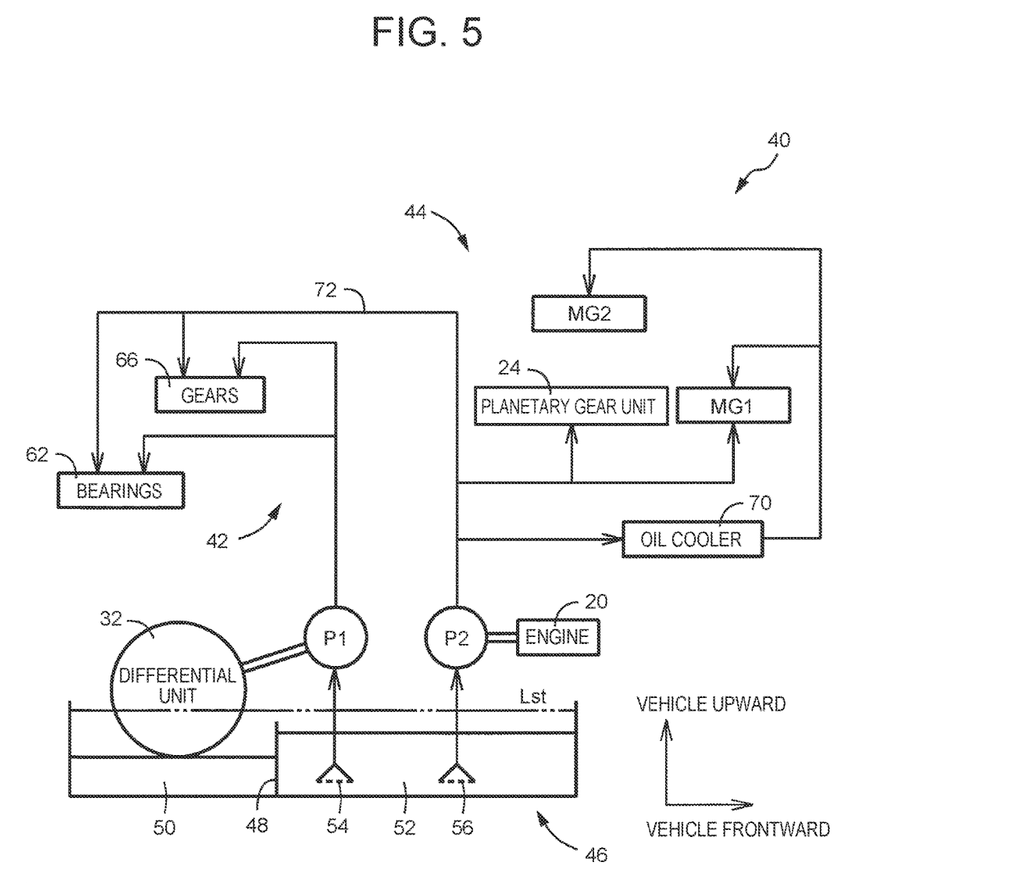
FIG. 5 is an oil-hydraulic circuit diagram explaining a lubricating apparatus included in the hybrid vehicle of FIG. 1.

In the meantime, the hybrid vehicle 10 of the present embodiment includes a lubricating apparatus 40 shown in FIG. 5. The lubricating apparatus 40 includes a first oil pump P1 and a second oil pump P2 as an intake unit, and are respectively connected to a first supply passage 42 and a second supply passage 44 that are separately independent from each other so as to lubricate respective components of the power transmission system 12. As shown in FIG. 1, the first oil pump P1 is a mechanical type oil pump mechanically rotary-driven via a pump drive gear Gp meshing with the differential ring gear Gd, and the second oil pump P2 is a mechanical type oil pump mechanically rotary-driven by the engine 20 connected to the input shaft 22. The first oil pump P1 may be configured to be rotary-driven by bringing the pump drive gear Gp to mesh with the large reduction gear Gr1 or the small reduction gear Gr2 or the like that are rotated together with the differential ring gear Gd. The second oil pump P2 is an oil pump that is rotary-driven by a rotary drive source different from an output unit (the differential unit 32), and is an oil pump rotary-driven by the engine 20 in the present embodiment; but there may be employed an electric oil pump rotary-driven by an electric motor.

The first oil pump P1 and the second oil pump P2 suck the lubricating oil from an oil reservoir 46 provided to a bottom of the transaxle case 14, and output the lubricating oil to the supply passages 42, 44. The oil reservoir 46 is composed by the transaxle case 14 itself, and is provided with a first oil reservoir 50 and a second oil reservoir 52 that are formed by partitioning the oil reservoir 46 in the vehicle longitudinal direction by a partitioning wall 48. The first oil reservoir 50 located at the rear side of the vehicle is a part located below the differential unit 32 that is the output unit, and the second oil reservoir 52 located at the front side of the vehicle is a part located below the first axial line S1 on which the planetary gear unit 24 and others are arranged; and an intake port 54 of the first oil pump P1 and an intake port 56 of the second oil pump P2 are both disposed in the second oil reservoir 52. The intake port 54 and the intake port 56 are respectively connected via different intake oil passages that are independently provided to the oil pumps P1, P2.

The partitioning wall 48 functions as the flow restricting part that allows the lubricating oil to flow between the first oil reservoir 50 and the second oil reservoir 52 and also restricts that the oil levels become equal to each other. This means that a static-state oil level Lst in a static state in which the operations of the oil pumps P1, P2 are both stopped when the vehicle stops and fluctuations of oil levels are stopped, because the lubricating oil having been supplied to the respective components of the power transmission system 12 flows down and returns to the oil reservoir 46, goes up over the partitioning wall 48 as indicated by a two-dot chain line in FIG. 2 and FIG. 5, and the oil levels of the both oil reservoirs 50, 52 become equal to each other. However, while the vehicle travels or the oil pumps P1, P2 are operated, the lubricating oil is supplied to the respective components of the power transmission system 12, and the amount of lubricating oil in the oil reservoir 46 becomes decreased, so that the oil level becomes lowered than an upper end of the partitioning wall 48, and the flow restriction by the partitioning wall 48 causes the respective oil levels of the both oil reservoir 50, 52 to change individually, as indicated by a solid line. As aforementioned, the intake performances of the oil pumps P1, P2, and the area, the amount of lubricating oil, and others of the oil reservoir 46 are defined so that the static-state oil level Lst in the static state goes up over the partitioning wall 48, and on the other hand, at the lubricating oil supplying time during the vehicle traveling, the oil level becomes lower than the position of the upper end of the partitioning wall 48 regardless of the return of the lubricating oil from the lubricated parts.

If the height position of the partitioning wall 48, that is, the position of the upper end thereof is higher than the position of a lower end of the differential unit 32, and in the static state in which the oil level is higher than the partitioning wall 48, a part of the differential unit 32 is soaked in the lubricating oil. In this manner, when the part of the differential unit 32 is soaked in the lubricating oil, the lubricating oil is scooped up by the differential ring gear Gd or the like when the vehicle starts, thereby splashing the lubricating oil to the respective components of the power transmission system 12; thus it is possible to secure a lubricating condition even at the vehicle starting time when it is difficult to supply a sufficient amount of lubricating oil by the first oil pump P1. When the vehicle starts, the engine 20 is normally stopped rotating in the EV travel mode, so that the operation of the second oil pump P2 is stopped.

On the other hand, when the oil pump P1 or the oil pump P2 is operated during the vehicle traveling, the oil level becomes lower due to the scoop-up by the differential ring gear Gd or the like rotating in accordance with the vehicle velocity V and the suck by the oil pumps P1, P2, so that the oil level becomes lower than the partitioning wall 48. Then, in the first oil reservoir 50, the oil level is determined based on the balance (proportion) between the scoop-up by the differential ring gear Gd or the like and the amount of the return oil, and in the second oil reservoir 52, the oil level is determined based on the balance between the suck by the oil pumps P1, P2 and the amount of the return oil. In the present embodiment, the amount of the lubricating oil, the volume of the first oil reservoir 50, that is, the position of the partitioning wall 48, the shape of the partitioning wall 48, and others are defined so that the oil level of the first oil reservoir 50 is preferentially lowered to be located in the vicinity of the lower end of the differential ring gear Gd as indicated by a solid line shown in FIG. 2 and FIG. 5. In this manner, when the oil level of the first oil reservoir 50 is preferentially lowered, agitation of the lubricating oil by the differential ring gear Gd or the like is suppressed, thus reducing energy loss to improve the fuel efficiency. Until the oil level reaches the upper end position of the partitioning wall 48 or therebelow, the lubricating oil is supplied by both the scoop-up by the differential ring gear Gd or the like and the intake at least by the first oil pump P1, so that the oil level is rapidly lowered; therefore, it is possible to properly reduce energy loss resulting from the agitation of the lubricating oil by the rotation of the differential unit 32.

By properly defining the position and the shape of the partitioning wall 48 or by defining the intake performances or the like of the oil pumps P1, P2, the oil level in the second oil reservoir 52 where the intake ports 54, 56 are disposed can be set to be higher than the first oil reservoir 50. Through this, the intake ports 54, 56 are exposed on the oil surface, thereby suppressing intake of the air, that is, air sucking of the oil pumps P1, P2, and properly sucking the lubricating oil as well as stably supplying the lubricating oil. That is, while the first oil reservoir 50 is partitioned by the partitioning wall 48 so as to secure a necessary and sufficient amount of lubricating oil or the lubricating oil having a necessary and sufficient oil level in the second oil reservoir 52, the oil level in the first oil reservoir 50 where the differential unit 32 is disposed is preferentially lowered, thereby suppressing the agitation of the lubricating oil by the rotation of the differential unit 32 to reduce energy loss.

Note that in the present embodiment, the intake ports 54, 56 are both disposed in the second oil reservoir 52, but, for example, the intake port 54 of the first oil pump P1 may be disposed in the first oil reservoir 50. In this case, the oil level of the first oil reservoir 50 can be lowered down to a position where the oil level does not reach the differential ring gear Gd. Taking the air sucking due to the lowering of the oil level into consideration, the first supply passage 42 may be provided with an oil storage. In addition, the partitioning wall 48 may be set to be higher than the static-state oil level Lst, and the partitioning wall 48 may be provided with an orifice or the like that allows a flow of the lubricating oil between the both oil reservoirs 50, 52 in a state of having a predetermined flow resistance. If it is unnecessary to consider the agitation of the lubricating oil by the differential ring gear Gd or the like, the partitioning wall 48 may be omitted.

The first supply passage 42 is connected to the discharge side of the first oil pump P1 so as to supply the lubricating oil to the respective components of the power transmission system 12. Specifically, it is configured to supply the lubricating oil to bearings 62 and gears 66 (e.g. Ge, Gr1, Gr2, Gd, Gm, Gp, etc.) of rotary shafts (such as the shaft 28) that are the respective components of the power transmission system 12 and lubricate the bearings 62 and the gears 66. The first supply passage has a first supply port, and the lubricating oil is supplied to the bearings 62 and the gears 66 via the first supply port. The first oil pump P1 is connected to the differential unit 32 so as to be rotary-driven, and thus the first oil pump P1 is also rotary-driven even in the EV travel mode in which the rotation of the engine 20 is stopped, as shown in FIG. 3; therefore, it is possible to suck the lubricating oil by an intake amount in accordance with the vehicle velocity V, and supply the lubricating oil to these respective components. The differential unit 32 is lubricated by the scoop-up of the lubricating oil by the differential ring gear Gd, for example, but can also be lubricated by supplying the lubricating oil to the differential unit 32 from the first supply passage 42. In addition, if there is possibility that the first oil pump P1 causes the air sucking or the like, an oil storage may be provided if necessary for the sake of a stable supply of the lubricating oil.

The second supply passage 44 connected to the discharge side of the second oil pump P2 supplies the lubricating oil to the input shaft 22, the planetary gear unit 24, and the first motor generator MG1 that are located above the second oil reservoir 52, and lubricates and cools these components. Further, this second supply passage 44 is provided with an oil cooler 70 so as to cool the lubricating oil, and supply the lubricating oil to the first motor generator MG1 and the second motor generator MG2, thereby cooling these components for preventing MG1 and MG2 from overheating. The oil cooler 70 cools the lubricating oil through heat-exchange by air-cooling, for example. The engine 20 that rotary-drives the second oil pump P2 can also drive the second oil pump P2 even when the vehicle is stopped, and thus it is possible to suck the lubricating oil by an intake amount not relied on the vehicle velocity V including the vehicle stopping time, and supply the lubricating oil to the lubricated parts; however, in the EV travel mode, as shown in FIG. 3, the operation of the second oil pump P2 is stopped along with the rotation stop of the engine 20.

The second supply passage 44 is also provided with a branch passage 72 that supplies the lubricating oil to the bearings 62 and the gears 66. This branch passage 72 is configured to supply the lubricating oil to the bearings 62 and the gears 66 independently from the first supply passage 42. The second supply passage 44 is provided with a second supply port, and in the present embodiment example in which the lubricating oil is supplied to the bearings 62 and the gears 66 via the second supply port, the bearings 62 and the gears 66 are the common lubricated parts, which are involved in the power transmission.

In this manner, the lubricating apparatus 40 of the hybrid vehicle 10 of the present embodiment is provided with the first oil pump P1 that is connected to the differential unit 32 as the output unit so as to be mechanically rotary-driven. Hence, even during the EV traveling in which the rotation of the engine 20 is stopped by free rotation of the first motor generator MG1, the lubricating oil is sucked by the first oil pump P1 from the second oil reservoir 52 in accordance with the vehicle velocity V so as to supply the lubricating oil to the lubricated parts such as the bearings 62 and the gears 64 and properly lubricate the lubricated parts. During the EV traveling, the sun gear 24s and the ring gear 24r of the planetary gear unit 24 are brought to idle, and the second motor generator MG2 is subjected to the power running control; therefore, it may be configured to supply the lubricating oil from the first supply passage 42 to the planetary gear unit 24 and the second motor generator MG2.

The second supply passage 44 is provided with the branch passage 72 so as to supply the lubricating oil to the bearings 62 and the gears 66 from the first supply passage 42 connected to the first oil pump P1 and from the second supply passage 44 connected to the second oil pump P2, independently. Hence, even during the low speed traveling in which the rotational speed of the first oil pump P1 rotary-driven in accordance with the vehicle velocity V is slow, that is, even if the discharge pressure of the first oil pump P1 is low, it is possible to supply the lubricating oil to the bearings 62 and the gears 66 separately from the both oil pump P1, P2 via the supply passages 42, 44 that are different from each other. Accordingly, even in the HV travel mode at a low vehicle velocity with a high load in which a requested drive force is great (an Ep region in FIG. 4), the lubricating oil is supplied to the bearings 62 and the gears 66 from both the first oil pump P1 and the second oil pump P2 via the supply passages 42, 44 that are different from each other, thereby properly lubricating the bearings 62 and the gears 66 with a sufficient supply amount of lubricating oil. Specifically, at the high load time, since the rotation of the engine 20 is brought to be relatively high by the transmission function of the electric differential unit 26, a large amount of lubricating oil is supplied from the second oil pump P2 at a high discharge pressure, and at the same time, the lubricating oil is also supplied from the first oil pump P1 at a relatively low discharge pressure; therefore, it is possible to properly lubricate the bearings 62 and the gears 66 with the lubricating oil supplied from the both oil pumps.

Figure 10:
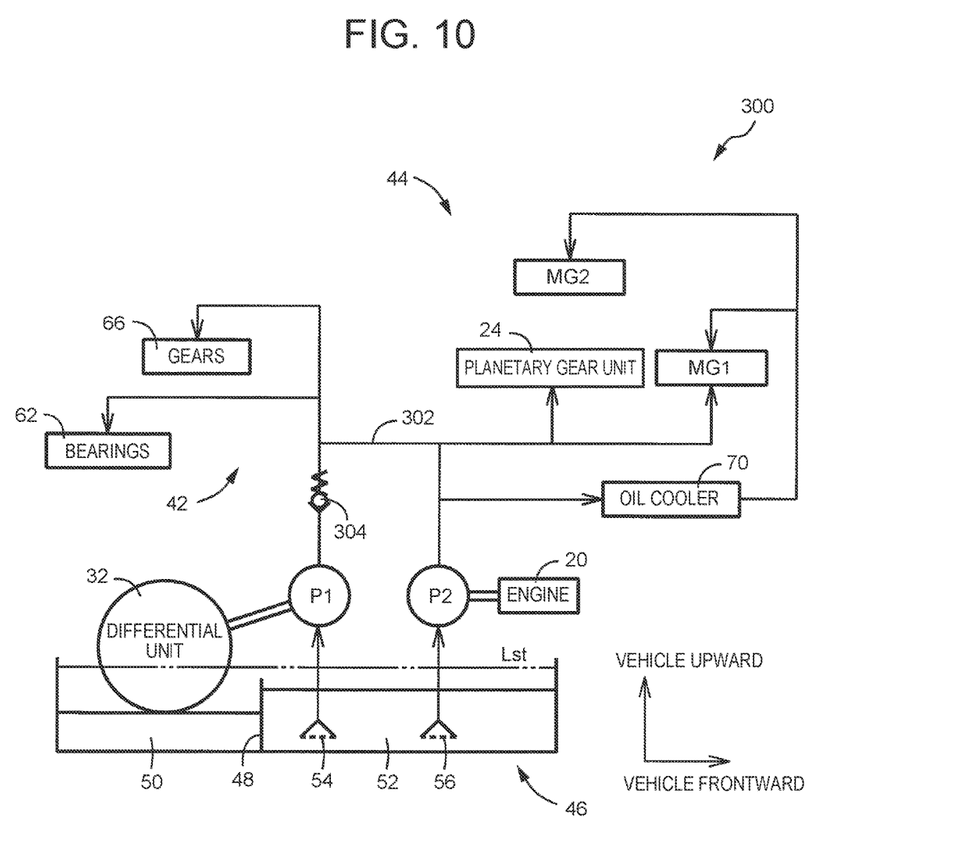
FIG. 10 is an oil-hydraulic circuit diagram explaining a lubricating apparatus that connects the second supply passage to the first supply passage so as to supply the lubricating oil to common lubricated parts, which corresponds to FIG. 5.

In the meantime, for example, as a lubricating apparatus 300 shown in FIG. 10, the first supply passage 42 and the second supply passage 44 may be connected to each other via a connecting passage 302 so as to supply the lubricating oil to the bearings 62 and the gears 66 from both the first supply passage 42 and the second supply passage 44, thereby simplifying the oil-hydraulic circuit. However, the rotation speed of the first oil pump P1 is slow when the vehicle travels at the low speed, and the discharge pressure thereof becomes decreased; to the contrary, during a high load time at a low vehicle velocity in which a requested drive force is great, like the Ep region in FIG. 4, for example, the rotation of the engine 20 is brought to be relatively high by the transmission function of the electric differential unit 26, and thus the discharge pressure of the second oil pump P2 rotary-driven by the engine 20 becomes high. Then, a large amount of lubricating oil is outputted from the second oil pump P2, so that the oil pressure of the second supply passage 44 becomes high, and when the oil pressure of the connecting passage 302 becomes higher than the discharge pressure of the first oil pump P1, a check valve 304 is closed so as not to supply the lubricating oil from the first oil pump P1; therefore, substantially, only the lubricating oil discharged from the second oil pump P2 is supplied, so that the supply amount of lubricating oil becomes insufficient.

Moreover, in the lubricating apparatus 40 of the present embodiment, since the first supply passage 42 and the second supply passage 44 are configured to be independent from each other, individual intake performances of the oil pumps P1, P2 can be set depending on the respective necessary oil amounts of the supply passages 42, 44 that are different from each other, thus suppressing unnecessary supply of the lubricating oil.

In addition, as the second oil pump P2, an oil pump operated by the engine 20 as the rotary drive source thereof is used; therefore, no complicated control is required, compared with the case of employing an electric oil pump rotary-driven by an electric motor, which is advantageous in cost, or the like.

Moreover, since the oil pumps P1, P2 are independently provided with the individual intake ports 54, 56 via the respective different intake oil passages, it is possible to individually set the arrangements of the intake ports 54, 56 and meshes depending on the discharge amount of each of the oil pumps P1, P2 and the positions of the lubricated parts by the supply passages 42, 44 or the like. For example, a strainer of the intake port 56 of the second oil pump P2 to which the lubricating oil is supplied through the oil cooler 70 preferably has a fine mesh.

The oil reservoir 46 is partitioned by the partitioning wall 48 into the first oil reservoir 50 and the second oil reservoir 52; and while an amount of lubrication oil that can prevent the air sucking of the oil pumps P1, P2 sucking the lubricating oil from the second oil reservoir 52 is secured, the lubricating oil in the first oil reservoir 50 is scooped up by the differential ring gear Gd, thereby preferentially lowering the oil level of the first oil reservoir 50, thus reducing energy loss due to the agitation by the differential ring gear Gd or the like.

In the meantime, in the static state in which the operations of the first oil pump P1 and the second oil pump P2 are stopped, that is, at the vehicle stopping time, the static-state oil level Lst goes up over the partitioning wall 48 due to the return of the lubricating oil from the lubricated parts, so that the oil level of the first oil reservoir 50 becomes the same as that of the second oil reservoir 52, and the differential unit 32 is partially soaked in the lubricating oil in the first oil reservoir 50. Accordingly, the lubricating oil is scooped up by the differential ring gear Gd or the like at the vehicle starting time, thereby splashing the lubricating oil to the respective components of the power transmission system 12, thus securing the lubricating condition at the vehicle starting time when it is difficult to supply a sufficient amount of lubricating oil by the first oil pump P1.

Next, another embodiment example will be described. In the following embodiment example, the same reference numerals are used for components substantially common to those in the above embodiment example, and detailed description thereof will be omitted.

Figure 6:
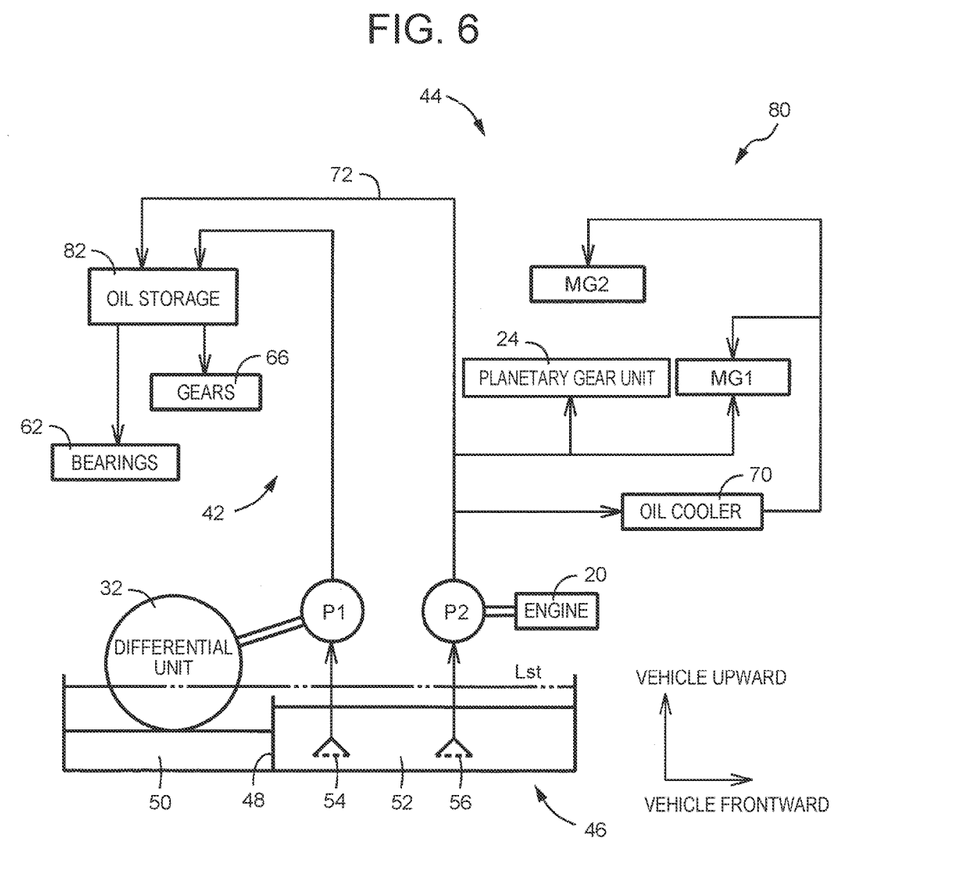
FIG. 6 is an oil-hydraulic circuit diagram explaining another example of the lubricating apparatus preferably provided to the hybrid vehicle of FIG. 1.

The lubricating apparatus 80 in FIG. 6 is the case of providing the first supply passage 42 with an oil storage 82 so as to supply the lubricating oil from the oil storage 82 to the bearings 62 and the gears 66, and the branch passage 72 provided to the second supply passage 44 is configured to supply the lubricating oil to the oil storage 82. By providing the oil storage 82 in this manner, it is possible to stably supply the lubricating oil to the bearings 62 and the gears 66 and properly lubricate the bearings 62 and the gears 66 even if the air sucking occurs in the oil pumps P1, P2 due to deviation of the lubricating oil (fluctuations of oil levels) due to change in posture of the vehicle in accordance with a slope of the road surface, steering, or the like, or due to acceleration and deceleration, or the like.

Figure 7:
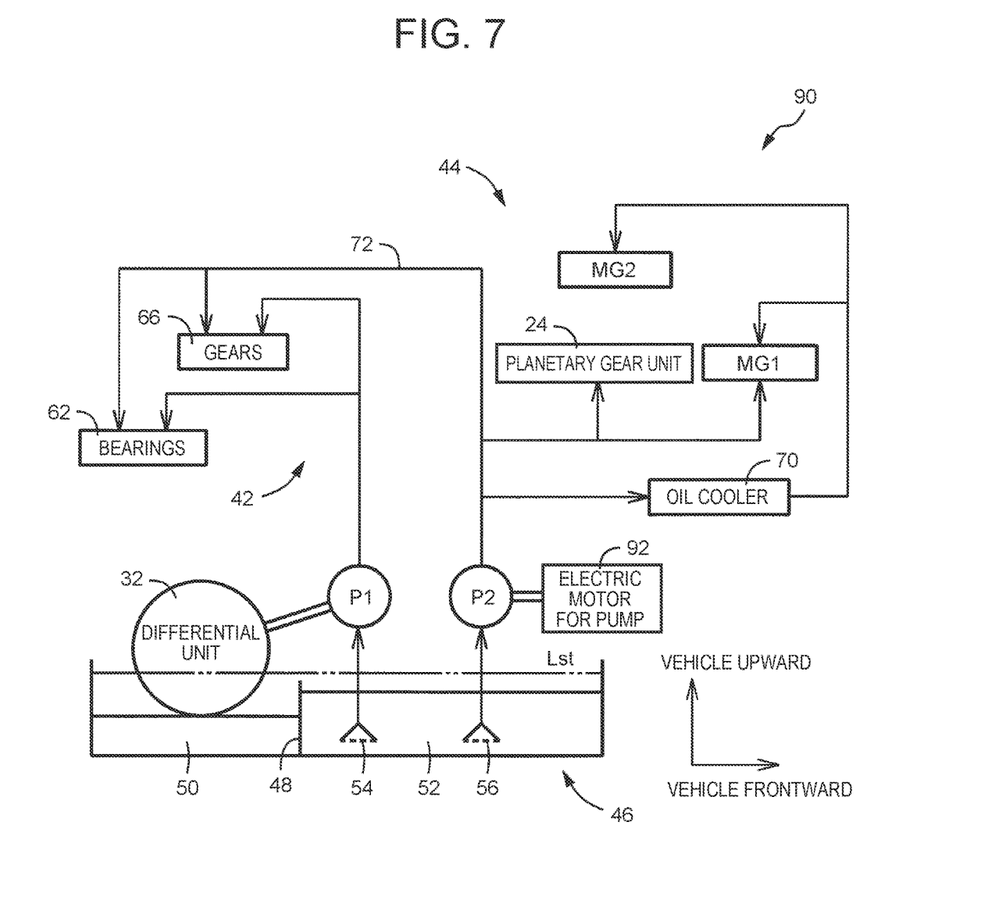
FIG. 7 is an oil-hydraulic circuit diagram explaining further another example of the lubricating apparatus provided to the hybrid vehicle of FIG. 1.

In a lubricating apparatus 90 shown in FIG. 7, the second oil pump P2 is different, compared with the lubricating apparatus 40 shown in FIG. 5, and an electric oil pump having an electric motor for pump 92 is used as the rotary driving source. The electric motor for pump 92 can rotary-drive the second oil pump P2 at any time, with any rotary-drive force, and at any rotational speed; therefore, regardless of the operation condition of the engine 20, it is possible to output a necessary amount of lubricating oil to the second supply passage 44 when necessary. For example, even during the EV traveling in which the rotation of the engine 20 is stopped, a sufficient amount of lubricating oil can be supplied from the second oil pump P2 to the second supply passage 44, thereby preventing seizing of planetary pinions or the like of the planetary gear unit 24 that are caused to co-rotate in accordance with the vehicle velocity V, or preventing overheating of the second motor generator MG2. Accordingly, it is possible to increase the upper limit of the vehicle velocity in the EV travel mode region in a PHV (a plug-in hybrid vehicle) or the like. As with each embodiment, it is also possible to bring the electric motor for pump 92 to operate in accordance with the operation of the engine 20 so as to supply the lubricating oil. Also in the lubricating apparatus 80 shown in FIG. 6, the electric oil pump may be used as the second oil pump P2.

Figure 8:
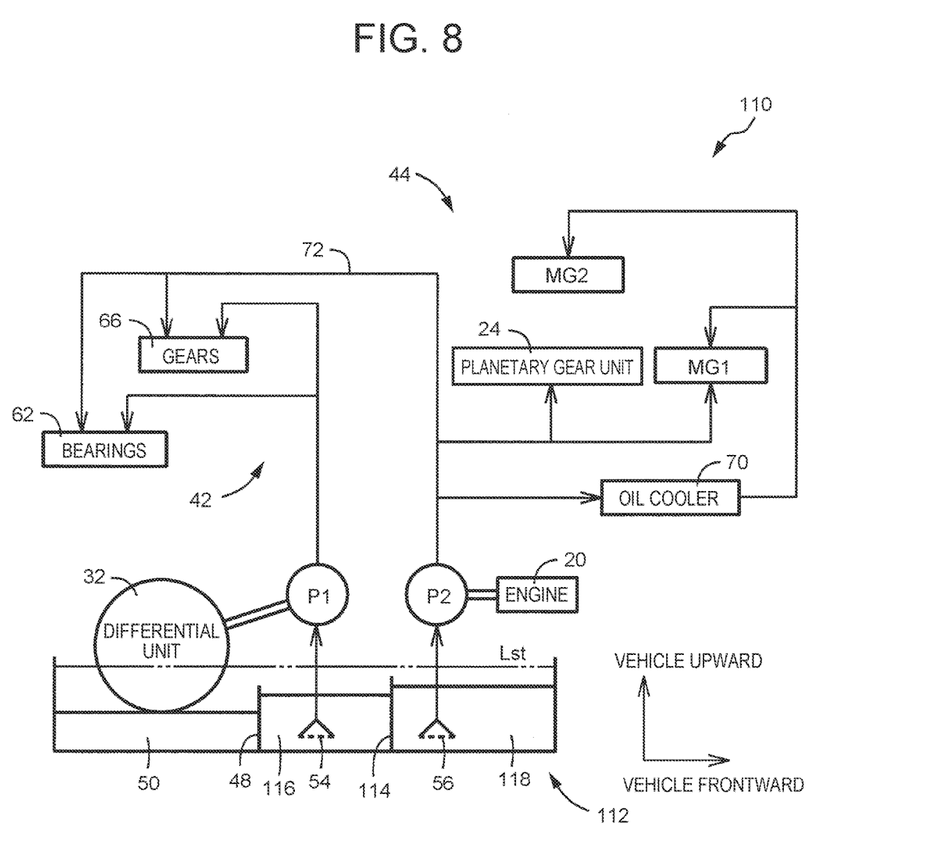
FIG. 8 is an oil-hydraulic circuit diagram explaining further another example of the lubricating apparatus provided to the hybrid vehicle of FIG. 1.

In a lubricating apparatus 110 in FIG. 8, an oil reservoir 112 is different, compared with the lubricating apparatus 40 in FIG. 5. This oil reservoir 112 is provided with a partitioning wall 114 in addition to the partitioning wall 48 as the flow restricting part, so that the oil reservoir 112 is divided into three parts in the vehicle longitudinal direction. The intake port 54 of the first oil pump P1 is disposed in a second oil reservoir 116 at the center position, and the intake port 56 of the second oil pump P2 is disposed in the third oil reservoir 118 located at the front position. The static-state oil level Lst, in the static state in which the operations of the oil pumps P1, P2 are both stopped and the fluctuations of the oil levels are stopped, goes up over the partitioning walls 48, 114 because the lubricating oil having been supplied to the respective components of the power transmission system 12 flows down to return to the oil reservoir 112, so that the oil levels of the oil reservoirs 50, 116, 118 become equal to each other. On the other hand, when the oil pumps P1, P2 are operated during the vehicle traveling or the like, the respective oil levels of the oil reservoirs 50, 116, 118 individually vary due to the flow restriction by the partitioning walls 48, 114 as indicated by a solid line. That is, in the first oil reservoir 50, the oil level is preferentially lowered by the scoop-up of the lubricating oil by the differential ring gear Gd or the like, so that the agitation of the lubricating oil by the differential ring gear Gd or the like is suppressed so as to reduce energy loss. On the other hand, the oil level of the second oil reservoir 116 and the oil level of the third oil reservoir 118 where the intake ports 54, 56 are respectively disposed are relatively higher, so that it is suppressed that the intake ports 54, 56 are exposed on the oil surfaces; thus it is possible to stably supply the lubricating oil.

The partitioning wall 114 may have the same height dimension as or a different height dimension from that of the partitioning wall 48, and the height dimension of the partitioning wall 114 may be higher than that of the partitioning wall 48 in the present embodiment. In this case, at the vehicle starting time, the oil level of the lubricating oil is lowered by the scoop-up of the rotation of the differential ring gear Gd or the like and the sucking at least by the first oil pump P1, and when the oil level is lowered down to the upper end of the partitioning wall 114 or therebelow, the inflow of the lubricating oil from the third oil reservoir 118 toward the second oil reservoir 116 is restricted. Accordingly, thereafter, the lowering of the oil levels in the second oil reservoir 116 and the first oil reservoir 50 are encouraged, thereby rapidly reducing energy loss due to the agitation caused by the rotation of the differential unit 32.

In the present embodiment, the second oil reservoir 116 and the third oil reservoir 118 are partitioned from each other, so that the respective dimensions in the vehicle longitudinal direction of the second oil reservoir 116 and the third oil reservoir 118 are reduced. Therefore, deviation of the lubricating oil due to change in posture of the vehicle in accordance with a slope of the road surface or the like, or due to acceleration and deceleration of the vehicle or the like is suppressed so that the fluctuations of oil levels are reduced, thereby further properly suppressing that the air sucking of the oil pumps P1, P2 whose intake ports 54, 56 are respectively disposed in the oil reservoirs 116, 118. Since the intake ports 54, 56 are separately disposed in the respective oil reservoirs 116, 118, the lubricating oil is sucked from both the oil reservoirs 116, 118; therefore, it is possible to secure a sufficient amount of lubricating oil, and also possible to individually set the intake performances of the oil pumps P1, P2 depending on the necessary oil supply amount, or depending on the amount of the return oil to the second oil reservoir 116 and the amount of the return oil to the third oil reservoir 118, and others so as to adjust the respective oil levels not to cause the air sucking, for example. Also in the lubricating apparatuses 80, 90, the oil reservoir 112 having such a configuration may be employed.

Figure 9:
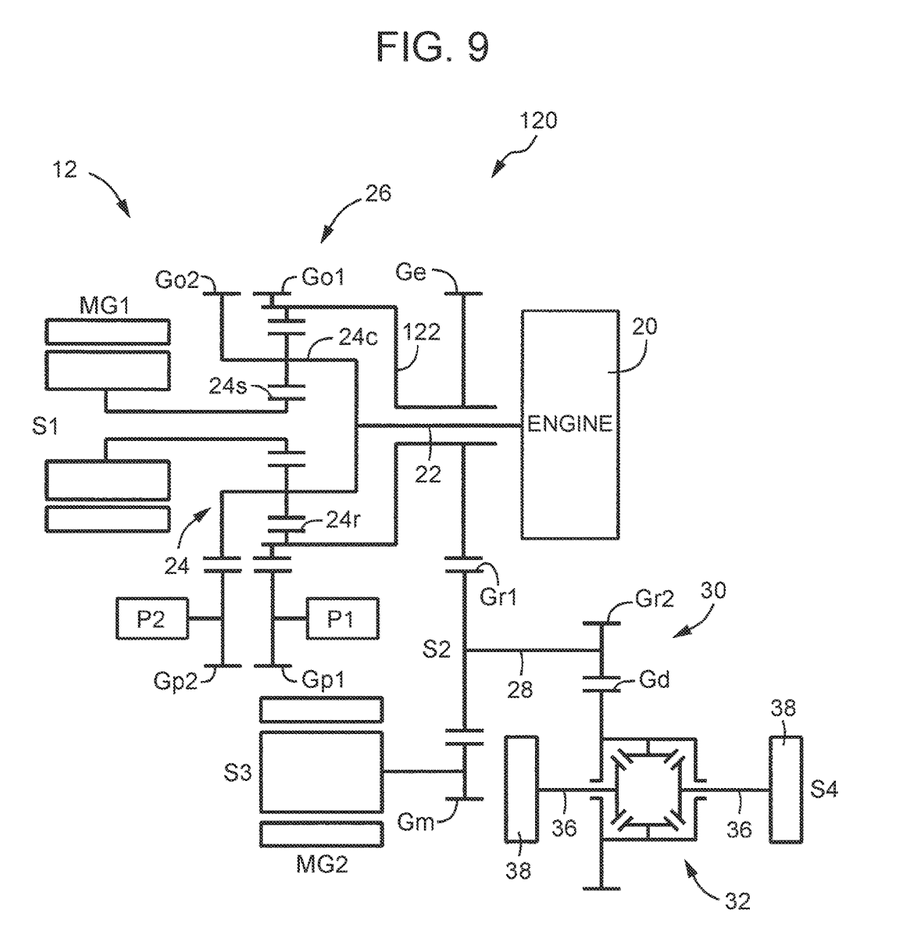
FIG. 9 is an outline view explaining a hybrid vehicle having a different manner of a mechanical connection of a pair of oil pumps, which corresponds to FIG. 1.

A hybrid vehicle 120 shown in FIG. 9 has a different structure to mechanically rotary-drive the oil pumps P1, P2, compared with the hybrid vehicle 10. Specifically, the first oil pump P1 is rotary-driven by a branching gear Go1 integrally provided to the ring gear 24r of the planetary gear unit 24 via a pump drive gear Gp1. The ring gear 24r is integrally provided with the engine output gear Ge via a connecting member 122 so as to be mechanically connected to the differential unit 32 via the large reduction gear Gr1 or the like in such a manner as to transmit motive power. The second oil pump P2 is rotary-driven via a pump drive gear Gp2 by the branching gear Go2 integrally provided to the carrier 24c of the planetary gear unit 24. The carrier 24c is integrally connected to the input shaft 22, and is mechanically rotary-driven along with the rotation of the engine 20. Accordingly, also in the hybrid vehicle 120, it is possible to preferably provide the lubricating apparatus 40, 80, 90, or 110, and attain the same operational effect.

As aforementioned, the embodiment examples of the present disclosure have been described with reference to the drawings, but they are merely examples of one embodiment and the present disclosure can be implemented in variously modified and improved forms based on the knowledge of those skilled in the art.

What is claimed is:

1. A lubricating apparatus applied to a vehicle having a power transmission system that transmits a drive force from a drive source via an output unit to driven wheels, the lubricating apparatus comprising:
    a first oil pump configured to be mechanically rotary-driven along with rotation of the output unit so as to discharge a lubricating oil;
    a second oil pump configured to be rotary-driven by a rotary drive source different from the output unit so as to discharge the lubricating oil;
    a first supply passage connected to a discharge side of the first oil pump on which the lubricating oil is discharged so as to supply the lubricating oil discharged from the first oil pump to lubricated parts of the power transmission system; and
    a second supply passage that is provided independently from the first supply passage and is connected to a discharge side of the second oil pump on which the lubricating oil is discharged so as to supply the lubricating oil discharged from the second oil pump to the lubricated parts of the power transmission system,
    wherein the first supply passage, between the first oil pump and the lubricated parts of the power transmission system, is not connected to the second supply passage, and wherein the second supply passage, between the second oil pump and the lubricated parts of the power transmission system, is not connected to the first supply passage.

2. The lubricating apparatus according to claim 1, wherein:
    the first supply passage includes a first supply port that supplies the lubricating oil to the lubricated parts, and
    the second supply passage includes a second supply port that is provided independently from the first supply port, and supplies the lubricating oil to the lubricated parts.

3. The lubricating apparatus according to claim 1, further comprising:
    a reservoir that holds the lubricating oil;
    a first intake passage connected to the first oil pump that sucks the lubricating oil from the reservoir; and
    a second intake passage that is provided independently from the first intake passage, and is connected to the second oil pump which sucks the lubricating oil from the reservoir.

4. The lubricating apparatus according to claim 1, further comprising:
    an oil storage provided to the first supply passage, the lubricating oil being supplied to the lubricated parts via the oil storage.

5. The lubricating apparatus according to claim 1, wherein:
    the vehicle is a hybrid vehicle including an engine and a rotary machine configured to drive the hybrid vehicle as the drive source,
    the vehicle includes an EV travel mode in which the vehicle travels by the rotary machine in a state in which the engine is stopped, and an HV travel mode in which the engine operates on a higher load side than that in the EV travel mode, and
    the second oil pump is an oil pump mechanically rotary-driven along with rotation of the engine.

6. The lubricating apparatus according to claim 1, wherein:
    the rotary drive source is an electric motor, and
    the second oil pump is rotary-driven by the electric motor.

7. The lubricating apparatus according to claim 1, wherein:
    the lubricated parts of the power transmission system are at least one of gears and bearings composing the power transmission system.

* * * * *